July 3, 1962 R. C. BEACHAM 3,042,038
SEGREGATION CHAMBER AND FLOW METER
Filed March 14, 1958
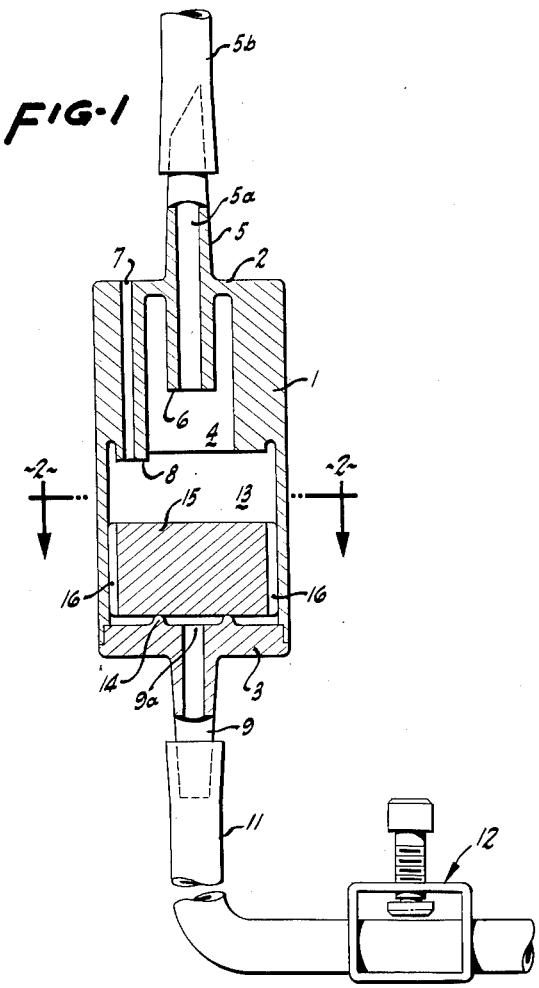
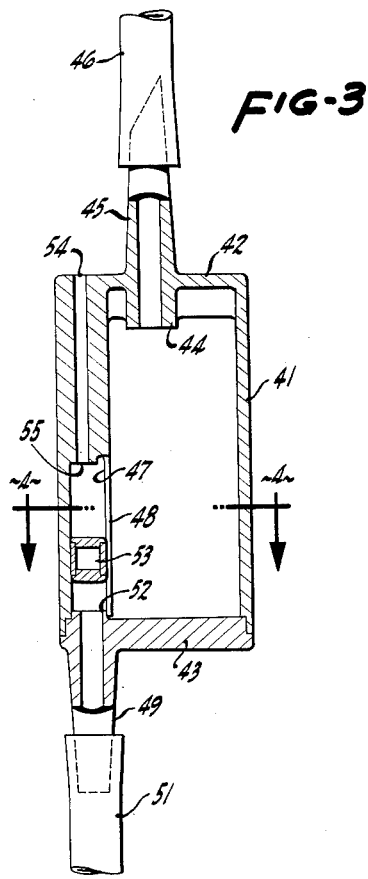
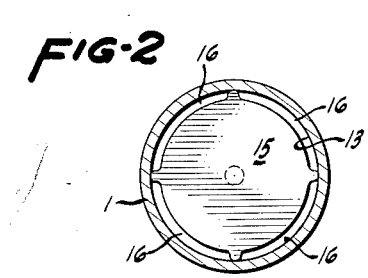
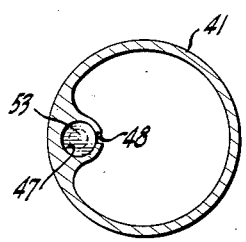
INVENTOR.
ROBERT C. BEACHAM
BY Mellin and Hanscom
ATTORNEYS

United States Patent Office 3,042,038
Patented July 3, 1962

3,042,038
SEGREGATION CHAMBER AND FLOW METER
Robert C. Beacham, Richmond, Calif., assignor to Cutter Laboratories, Berkeley, Calif., a corporation of California
Filed Mar. 14, 1958, Ser. No. 721,481
2 Claims. (Cl. 128—214)

This invention relates to transfusion sets and in general has for its object the provision of a flow meter and segregation chamber for inclusion in said sets and by which air embolisms in pateints receiving transfusions can be avoided.

This application is a continuation-in-part of my co-pending application Serial No. 503,684, filed April 25, 1955, for "Segregation Chamber for Transfusion Sets," issued July 22, 1958, as Patent No. 2,844,147.

As is well known, intravenous solutions are administered from a flask or bottle through a section of flexible tubing connected at its free end to a hypodermic needle. Since air embolisms should of course be avoided, all air contained within the flexible tubing must be completely displaced with the solution to be administered prior to the insertion of the hypodermic needle into the patient. Up to the present, this has entailed a rather tedious and time-consuming manipulation of the tubing. Furthermore, as the end of the administration approaches and the solution has been substantially drained from its container, care must be taken to insure that no air becomes entrained in the solution and which might thereby result in an embolism. In short, with transfusion sets now commercially available there is danger of producing air embolisms both at the beginning as well as at the end of an administration. Furthermore, the problem has been made more acute due to two additional factors. Customarily, a drip meter, oftentimes in combination with a filter, is inserted in the transfusion line, the drip meter chamber being of a size at which additional air can be entrained in the intravenous solution. Frequently, intravenous solutions are administered under pressure to give rapid transfusions. Although this pressure is not great, nevertheless it can be the cause of an increase in the amount of air entrained in the solution, particularly at the site of the drip meter.

More specifically, the object of this invention is the provision in a drip meter of a transfusion set having an inlet at its upper end and an outlet at its lower end, an air vent provided adjacent its upper end, and a float closure member disposed within the confines of the drip meter for selectively closing the drip meter outlet and air vent, depending upon the liquid level within the drip meter, and without closing its inlet.

The invention possesses other advantageous features, some of which, with the foregoing, will be set forth at length in the following description where those forms of the invention which have been selected for illustration in the drawings accompanying and forming a part of the present specification, are outlined in full. In said drawings, two forms of the invention are shown, but it is to be understood that it is not limited to such forms, since the invention as set forth in the claims may be embodied in other forms.

Referring to the drawings,

FIG. 1 is a vertical mid-section of a combination flow meter and air segregation chamber embodying the objects of my invention.

FIG. 2 is a transverse section taken on the section line 2—2 of FIG. 1.

FIG. 3 is a vertical mid-section of a modification of my invention.

FIG. 4 is a transverse section taken on the section line 4—4 of FIG. 3.

As illustrated in FIGS. 1 and 2, the objects of my invention have been embodied in a combination flow meter and air segregation chamber comprising a transparent cylinder 1 including an upper end 2 and a lower end 3. Formed in the upper end 2 of the cylinder is an air chamber 4. Extending upwardly from the upper end 2 is a hollow spike 5 serving as an inlet 5a for the cylinder and as a convenient means for connecting it directly to a bottle or to a section of tubing 5b, which in turn can be connected to such bottle in any well known manner. Formed as an extension of the spike 5 and depending into the air chamber 4 is a drip nipple 6 having positive clearance with the walls of the chamber 4. Also extending through the upper end 2 of the cylinder is an air vent 7 surrounded at its lower end with a depending valve seat 8.

Merging with the lower end 3 of the cylinder is a hollow depending tapered nipple 9 serving as an outlet 9a for the cylinder and also as a convenient way of connecting the cylinder with a section of flexible tubing 11. Provided intermediate the ends of the tubing 11 is a conventional pinch valve 12.

The lower end of the cylinder 1 defines a liquid chamber 13 merging at its upper end with the air chamber 4 and being of a greater diameter than the chamber 4.

Surrounding the outlet 9a is a raised valve seat 14 extending into the liquid chamber 13, and disposed within the liquid chamber is a cylindrical float valve closure member 15 provided on its peripheral walls with axial fluid channels 16. Conveniently, the float 15 can be made of cork, polyethylene or polyethylene foam, the latter being lighter than the former and also lighter than cork by reason of its air content.

As a result of this construction, it will be seen that unless the valve closure member is afloat, it seats on its associated valve seat 14 thereby functioning to close off the outlet 9a and thereby prevent all further flow of fluid (liquid and/or air) therethrough. In this condition of the valve closure member the air outlet vent 7 is open as is also the fluid inlet 5a. This condition of the device may be considered as its initial or starting condition. Here it should be observed that in this starting condition, air completely fills the entire device and its associated sections of tubing.

Now assume that the pinch valve 12 is closed and that the tubing 5b is connected with a source of liquid such as an intravenous solution. Under these conditions liquid will flow through the dip nipple 6 into the liquid chamber 13 and through the channels 16 to the bottom of the chamber 13 to a point below the float closure member 15. The liquid level will then rise within the chamber 13 and at some point a liquid level will be reached wherein the closure member 15 will float and thereby open the outlet 9a. A solid column of liquid will then progress down the tubing 11 until it is balanced by the underlying column of air. In the meantime, the liquid level within the chamber 13 will continue to rise and with it the closure member 15 until the latter seats on the valve seat 8, at which point the system becomes a closed system. Up to this point, any air within the chamber 13 being displaced by the liquid content within the chamber is free to escape through the vent 7.

All this having been done, the pinch valve 12 can now be momentarily opened to permit the further flow of liquid through the system so as to completely displace the column of air within the tubing 11 and its associated needle with a solid column of liquid. The pinch valve 12 can then be closed, and the device is ready for making an intravenous injection.

To this end, the needle is inserted in the vein of a patient and the pinch valve 12 cracked to a sufficient extent to permit the desired rate of flow. Normally, the desired flow is drop by drop, but at all events it can be observed through the transparent cylinder 1 and adjusted at will by the pinch valve 12.

During the operation of the device, the float closure member 15 maintains the air vent 7 closed, the density of this member being so chosen that this condition will be maintained within a limited range of liquid levels within the chamber. If, however, the liquid level momentarily drops to an extent sufficient to permit the member 15 to open the air vent, the liquid level will immediately rise to its operating level.

When, however, the bottle to which the tubing 5b is connected has been completely drained of its contents and the level of the liquid within the chamber 13 is dropped below its operating level, the vent 7 will open, allowing any air under positive pressure from within the container to escape, and the chamber 13 will be drained of its contents until the closure member closes off the outlet 9a. This of course occurs while the tubing 11 is still completely filled with a solid column of liquid.

One other factor should here be noted. The diameter of the tubing 11 should be sufficiently small to preclude a film of liquid from running down its interior walls and to insure that such liquid always travels as a solid column.

As a result of this structure, it will be seen that I have provided a combination drip meter and air segregation chamber having an outlet at its lower end, an air vent adjacent its upper end, and a float closure member arranged to operate between such outlet and vent in response to the liquid level within the chamber. The vent remains open long enough during conditioning of the device to permit the escape of air within the chamber and thereby prevents air from becoming entrained in liquid passing through the system and permitting air which may be entrained in the liquid delivered to the chamber to separate out. Following this, the closure member 15 automatically closes the vent 7 to thereby form a closed system and prevent the escape of liquid therethrough. Lastly, and at the end of the injection, the closure member 15 closes the outlet 9a and this serves to hold a solid column of liquid within the tubing 11 and to prevent the ingress of air thereto.

Although the function of the modification disclosed in FIGS. 3 and 4 is identical to the function of the structure above described, its construction differs in that its float closure member operates within a cage disposed to one side of the cylinder.

More specifically, this modification includes a cylindrical chamber 41 closed at its upper end by a top 42 and closed at its lower end by a bottom 43 cemented or otherwise secured thereto. Extending into the top 42 is a drip nipple 44 merging with an upwardly extending tapered spike 45 adapted to be connected either directly to an intravenous solution bottle or indirectly thereto through a section 46 of flexible tubing. Formed at one side of the lower portion of the chamber 41 is a cylindrical float guide 47 having a slot 48 on its inner side.

Formed integrally with the bottom 43 in vertical registration with the cage 47 is a connecting nipple 49, the lower end of this nipple being secured to a section 51 of flexible tubing, the free end of which is arranged to be connected with a hypodermic needle. The upper end of the nipple 49 terminates in the valve seat 52 extending upwardly into the valve cage 47. Disposed within the valve cage 47 and freely slidable therein is a hollow float valve 53 arranged in its lower position to seat on the seat 52, thereby closing off communication between the chamber 41 and the nipple 49. Extending through the thickened side wall of the chamber 41 in vertical alignment with the valve cage 47 is a vent hole 54 provided at its lower end with a valve seat 55.

Since, as above stated, this modification functions in precisely the same manner as the modification disclosed in FIGS. 1 and 2, there seems no good reason for again going through its various steps of operation.

I claim:

1. An air segregator and drip meter for transfusion sets comprising: a transparent segregation chamber provided at its upper end with an inlet connection and with an air vent having a first valve seat and provided at its lower end with an outlet port having a second valve seat; a drip meter nipple formed in the upper end of said chamber merging with said inlet connection and depending into said chamber; and a guided float valve closure member disposed in said chamber operable to seat on said second valve seat when said chamber is substantially empty of liquid and to seat on said first valve seat when the liquid content of said chamber reaches a predetermined level.

2. An air segregator and drip meter for transfusion sets comprising: a transparent segregation chamber provided at its upper end with an inlet port and at its lower end with an outlet port having a first valve seat; a drip meter nipple formed in the upper end of said chamber merging with said inlet port and depending into said chamber; and a guided float valve closure member disposed within said chamber, portions of said closure member being spaced from said chamber to thereby permit the passage of fluid between the side walls of said chamber and said closure member, said chamber being provided with a vent extending through its upper end and having a second valve seat, said valve closure member being operable to seat on said first valve seat on its downward movement and to seat on said second valve seat on its upward movement.

References Cited in the file of this patent

UNITED STATES PATENTS

| | | |
|---|---|---|
| 1,200,764 | Schneible | Oct. 10, 1916 |
| 2,090,273 | Wagner | Aug. 17, 1937 |
| 2,149,633 | Schnoor | Mar. 7, 1939 |
| 2,252,687 | Bassett | Aug. 19, 1941 |
| 2,693,801 | Foreman | Nov. 9, 1954 |
| 2,784,733 | Martinez | Mar. 12, 1957 |